United States Patent
De Vos et al.

(10) Patent No.: US 11,157,032 B2
(45) Date of Patent: Oct. 26, 2021

(54) POWER MANAGEMENT INTEGRATED CIRCUIT WITH OPTIMUM POWER POINT EVALUATION

(71) Applicant: E-PEAS S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 43 days.

(21) Appl. No.: 16/624,983

(22) PCT Filed: Jun. 21, 2018

(86) PCT No.: PCT/EP2018/066635
§ 371 (c)(1),
(2) Date: Dec. 20, 2019

(87) PCT Pub. No.: WO2018/234485
PCT Pub. Date: Dec. 27, 2018

(65) Prior Publication Data
US 2020/0233443 A1    Jul. 23, 2020

(30) Foreign Application Priority Data
Jun. 22, 2017  (EP) .................................... 17177467

(51) Int. Cl.
*G05F 1/67*   (2006.01)
*H02J 50/00*  (2016.01)

(52) U.S. Cl.
CPC .............. *G05F 1/67* (2013.01); *H02J 50/001* (2020.01)

(58) Field of Classification Search
CPC combination set(s) only.
See application file for complete search history.

(56) References Cited

U.S. PATENT DOCUMENTS

| | | | | |
|---|---|---|---|---|
| 6,493,246 B2 * | 12/2002 | Suzui | ........................ | H02J 7/35 323/906 |
| 8,379,418 B2 * | 2/2013 | Falk | ........................ | H02M 1/36 363/49 |
| 2011/0232714 A1 * | 9/2011 | Bhavaraju | ............... | H02J 3/385 136/244 |
| 2012/0075898 A1 * | 3/2012 | Sigamani | ............... | H02J 3/385 363/131 |

(Continued)

OTHER PUBLICATIONS

Int'l. Search Report for PCT/EP2018/066635, dated Oct. 24, 2018.

(Continued)

*Primary Examiner* — Nguyen Tran
(74) *Attorney, Agent, or Firm* — Blue Filament Law PLLC (57) ABSTRACT

A power management integrated circuit (PMIC) is provided for extracting power from an energy harvester. The PMIC includes a power point tracker configured for defining an optimum operational voltage for efficiently extracting power from any type of energy harvesters such as electromagnetic energy sources, photovoltaic cells or thermal electric generators. The power management integrated circuit (PMIC) also relates to an energy harvesting system that includes an electromagnetic energy source and an impedance connected to the PMIC.

13 Claims, 6 Drawing Sheets

(56) References Cited

U.S. PATENT DOCUMENTS

| | | | |
|---|---|---|---|
| 2014/0097669 A1* | 4/2014 | Nagashima | H02M 1/4225 307/9.1 |
| 2014/0111015 A1* | 4/2014 | Fall | H02J 7/0063 307/66 |
| 2015/0229131 A1* | 8/2015 | Gerhardinger | H02J 3/381 307/22 |
| 2017/0126010 A1 | 5/2017 | Canales | |

OTHER PUBLICATIONS

"Ultra Low Power Boost Converter With Battery Management for Energy Harvester Application," Sep. 30, 2012, pp. 1-25, XP055196210, http://www.farnell.com/datasheets/1801.

* cited by examiner

POWER MANAGEMENT INTEGRATED CIRCUIT WITH OPTIMUM POWER POINT EVALUATION

FIELD OF THE INVENTION

The present invention relates to an energy harvesting system comprising an energy harvester and a power management integrated circuit (PMIC) for efficiently managing energy from the energy harvester.

DESCRIPTION OF PRIOR ART

PMIC's for energy harvesting are known in the art and typically comprise an input terminal for making a connection with the energy harvester so as to receive an input power. A voltage converter receives the input power from the energy harvester and converts an input voltage into an output voltage. The output of the voltage converter is connected with an output terminal for supplying an output power. The output terminal can then be connected with for example an energy storage device and/or an application load. The application load is for example an application circuit such as microcontroller or a radio transceiver.

A power management integrated circuit for energy harvesting is for example available from the applicant of the current patent application and known under the reference number AEM10940. The PMIC has to be construed as an interface between the energy harvester and an energy storage device and, generally, also an interface to one or more application loads or application circuits. During operation, energy is extracted from the energy harvester source and transferred to the energy storage device via the PMIC. The energy stored in the energy storage device can then be supplied to the one or more application circuits or alternatively, energy of the energy harvester is transferred directly to the application load via the voltage converter.

The PMIC for energy harvesting is a microchip that is designed to acquire and manage the microwatts to milliwatts of power generated by the energy harvester source. For example the PMIC with reference AEM10940 operates with input voltages in a range of 100 mV to 2.5V. This PMIC also comprises a so-called cold-start circuit that allows to start operation when there is no energy stored in the energy storage device. A cold-start can for example start at an input voltage as low as 380 mV and with an input power of 11 microwatt.

Examples of energy harvesters are photovoltaic cells (PV), thermoelectric generators (TEG) and electromagnetic energy sources. Examples of storage devices are Li-ion battery, a thin film battery or a super or a conventional capacitor.

The PMIC for energy harvesting generally also comprises a power point tracker (PPT) for determining an optimum operational voltage $V_{OPT}$ for extracting power from the energy harvester. Generally, an optimum voltage $V_{OPT}$ is determined for extracting maximum power from the energy harvester. These PMIC's for small energy harvesters generally use simple power point evaluation methods either based on a constant voltage tracking or based on a determination of a ratio of the open circuit voltage.

Constant voltage tracking does however not suit harvesters that have a maximum power point voltage that varies with the power they are capable of delivering at a given moment. The second method, based on an open circuit voltage measurement, assumes that the harvester can be temporarily unloaded and that the maximum power point voltage will be proportional to that open-voltage.

Examples of PMIC's that are configured for utilising the open-circuit voltage tracking method is for example the PMIC with reference AEM10940 mentioned above or the PMIC known under reference PQ25504 manufactured by Texas Instruments and described in corresponding data sheet "Ultra Low Power Boost Converter with Battery Management for Energy Harvester Applications", 2012. When using PV-cells, the optimum operational voltage $V_{OPT}$ extracting power from the energy harvester is determined by taking a ratio, for example 80% or 90% of the open-circuit voltage as optimum operational voltage. The selection of the ratio value of 80% or 90% can be configured, such as with the AEM10940 PMIC, by setting a configuration terminal of the PMIC to a high or low signal, or, as in the case of the PQ25504, a configuration terminal of the PMIC in combination with an external voltage divider is used to define any specific ratio value to be used.

There exist however some energy harvesters for which nor the open-circuit voltage tracking method nor the constant voltage tracking method is optimal. This is the case for example for electromagnetic harvesters such as turbines or some specific vibration harvesters. These energy sources deliver their maximum power over the whole power range while being loaded at constant impedance. If power varies but impedance remains constant, constant voltage tracking is not appropriate. Open-circuit voltage evaluation with an optimum voltage evaluated as being a fraction of the open-circuit voltage would work in some cases but with one important limitation, namely that during power point evaluation, the energy harvester would be unloaded. This can have dramatic consequences for such harvesters. For instance, in the case of a turbine, water flow can accelerate during the power point evaluation as the turbine is not loaded anymore which can disrupt the system. In the case of vibration energy harvesting, this can even lead to a destruction of the harvester or of its PMIC because of a dramatic increase of the harvester voltage.

SUMMARY OF THE INVENTION

It is an object of the present invention to provide a PMIC that provides a solution for the problems mentioned above with respect to power point evaluation and to provide a PMIC that is capable of efficiently extracting power from various types of energy harvesters, including electromagnetic harvesters.

The present invention is defined in the appended independent claims. Preferred embodiments are defined in the dependent claims.

In particular, the present invention concerns an energy harvesting system comprising an energy harvester and a power management integrated circuit PMIC for managing energy from the energy harvester.

Such a PMIC for energy harvesting comprises an input terminal for connecting the energy harvester so as to receive an input power, a first output terminal for connecting an energy storage device or for connecting an application load and a voltage converter configured for converting an input voltage $V_{in}$ into an output voltage $V_{out\_VC}$. This voltage converter is configured for regulating the input voltage $V_{in}$ at a target voltage. A first conducting path is configured for transferring the input power to the voltage converter and a first connecting circuit is provided for transferring an output power from the voltage converter to the first output terminal.

The PMIC further comprises a voltage sensor configured for sensing the input voltage $V_{in}$ at the input of the voltage converter and a power point tracker for determining an optimum operational voltage $V_{OPT}$ for extracting power from the energy harvester. The determination of this optimum operational voltage is based on a voltage $V_{in\_PPT}$ sensed at an input of the power point tracker.

The PMIC according to the invention is characterized in that it comprises a power point tracker terminal suitable for connecting an impedance and wherein the power point tracker terminal is conductively connected with the input of the power point tracker. The power point tracker terminal will further be named PPT terminal.

A second conducting path is configured for conductively connecting the input terminal with the PPT terminal and a first switch is configured for enabling or disabling a current flow in the second conducting path by closing or opening the first switch. The PMIC comprises means to enable or disable the operation of the voltage converter and a main controller is configured to repetitively perform steps of closing the first switch, disabling the operation of the voltage converter, enabling the power point tracker for sampling the voltage $V_{in\text{-}PPT}$ sensed at the input of the power point tracker and memorizing the sampled voltage or a percentage of the sampled voltage as the operational voltage $V_{OPT}$, opening the first switch, enabling the operation of the voltage converter and regulating the input voltage $V_{in}$ of the voltage converter using the operational voltage $V_{OPT}$ memorized by the power point tracker as the target voltage.

Advantageously, by providing a PPT terminal conductively connected with the input of the power point tracker, by providing the second conductive path connecting the PPT terminal with the input terminal that is receiving input power from the energy harvester, by providing a first switch S1 for opening and closing this second conductive path and by providing a main controller executing the controller steps as defined above, a PMIC architecture is formed that supports power point tracking for various types of energy harvesters including, but not limited to, electromagnetic harvesters, PV cells, TEG's and RF based harvesters.

Indeed, if for example an electromagnetic harvester is connected to the input terminal, an impedance correlated with the impedance of the electromagnetic harvester can be connected to the PPT terminal. By closing the first switch and, as the PPT terminal is conductively connected with the input of the power point tracker, the power point tracker will sense a voltage of the energy harvester under conditions where the impedance is coupled to the energy harvester. Hence the power point track will determine the optimum operational voltage $V_{OPT}$ under these impedance load conditions. By opening the first switch, the impedance is disconnected from the energy harvester and the main controller can start regulating the input voltage $V_{in}$ of the voltage converter using as target value the operational voltage $V_{OPT}$ obtained with the power point tracker.

A further advantage of the PMIC according to the invention is that the energy harvester remains loaded during the power point evaluation through the connection of an impedance at the PPT terminal. This impedance is typically selected to be equal to the output impedance of the electromagnetic energy harvesting device itself. In contrast, when for example a classical open circuit PPT evaluation is made, the energy harvester is not loaded during the power point evaluation which can result in dangerous situations. In the case of vibration energy harvesting this can even lead to the destruction of the energy harvesting device.

In a further example, when using a PV cell as an energy harvester, the same PMIC according to the invention can be used. In this example, the PPT terminal has an open circuit connection and when the first switch S1 is closed, the power point tracker will evaluate the optimum operational voltage $V_{OPT}$ as an open circuit voltage of the energy harvester or as a fraction of this open circuit voltage.

Alternatively, using the same PMIC architecture according to the invention, also the power point tracking method using a constant reference voltage can be applied. In this case, a constant reference voltage is applied to the PPT terminal using a reference voltage generator. This reference voltage is then considered by the power point tracker to be the optimum operational voltage $V_{OPT}$.

Advantageously, by performing the optimum voltage evaluation repetitively, the power will always be extracted from the energy harvesting device in an optimum way.

In embodiments according to the invention, the means to enable or disable the operation of the voltage converter comprises a second switch configured to enable or disable a current flow from the input terminal to the voltage converter.

In preferred embodiments, the power point tracker is configurable for defining two or more values for said percentage of the sampled voltage, including a value of 100%. Advantageously, with a power point tracker that is configurable, the user can configure the PMIC to specify what fraction of the input voltage of the power point tracker needs to be used to determine the optimum operational voltage. In particular, when an impedance is connected to the PPT terminal this fraction can be configured to be 100%.

In further embodiments, the PMIC comprises a configuration terminal configured for receiving a configuration signal or a bus signal indicating the percentage of the sampled voltage to be memorized as the optimum operational voltage $V_{PPT}$. The configuration terminal is connected with the power point tracker for transferring the configuration signal or bus signal.

The present invention is also related to an energy harvesting system comprising a power management integrated circuit PMIC according to the invention, an energy harvester connected to the input terminal of the PMIC and an impedance connected to the PPT terminal.

SHORT DESCRIPTION OF THE DRAWINGS

These and further aspects of the invention will be explained in greater detail by way of example and with reference to the accompanying drawings in which.

The figures are not drawn to scale. Generally, identical components are denoted by the same reference numerals in the figures.

DETAILED DESCRIPTION OF PREFERRED EMBODIMENTS

Various embodiments of a power management integrated circuit PMIC according to the invention are schematically illustrated in FIG. 1 to FIG. 4. When in operation, a PMIC manages a transfer of electrical power from an energy harvester to an energy storage device and/or a load.

The PMIC has to be construed as a microchip comprising integrated circuits and a number of input/output pins, also named terminals or connectors or leads. Typically a PMIC can have between 16 and 32 terminals. Generally, the PMIC's have a compact packaging typically resulting in a square or rectangular footprint with sides having a length between 3 and 5 mm. On the FIGS. 1 to 4, the rectangular with a dotted pattern schematically illustrates the footprint of the PMIC.

A PMIC according to the invention comprises a voltage converter 20 and a power point tracker 30. The power point tracker is determining an optimum operational voltage $V_{OPT}$ for extracting power from the energy harvester. The power point tracker is operable for sampling a voltage $V_{in\_PPT}$ sensed at an input of the power point tracker.

The voltage converter 20 is configured for converting an input voltage $V_{in}$ at an input of the voltage converter into an output voltage $V_{out\_VC}$ at an output of the voltage converter. The voltage converter is also configured for regulating the input voltage $V_{in}$ at a target voltage. Regulating the input voltage $V_{in}$ at a target voltage has to be construed as continuously comparing the input voltage $V_{in}$ with the target voltage and reducing the input voltage when the input voltage is above the target voltage and allowing increasing the input voltage when the input voltage is below the target voltage. During the regulation of the voltage converter 20, the input voltage $V_{in}$ is sensed with the voltage sensor 25.

A first connecting circuit 26 is configured for transferring electrical power from the voltage converter 20 to the first output terminal 12. This first output terminal 12 allows for connecting an energy storage device or for connecting an application load.

The output voltage $V_{out}$ at the first output terminal 12 can be equal or different from the output voltage $V_{out\_VC}$ at the output of the voltage converter 20. For example, if the first connecting circuit 26 is a conductor or a conducting path, the voltage at the output terminal will be equal to $V_{out\_VC}$. In other embodiments, as will be discussed below, the first connecting circuit 26 can for example comprise a storage controller for controlling a storage device or it can comprise further voltage converters or regulators to transfer electrical power. For these embodiments, the output voltage at the output terminal $V_{out}$ can be different from the output voltage at the output of the voltage converter $V_{out\_VC}$.

The PMIC according to the invention is not limited to one output terminal. As will be further discussed below, in embodiments according to the invention, multiple output terminals can be present. For example, a first output terminal can be used to connect the storage device and one or more additional output terminals can be used to connect one or more application loads.

The PMIC according to the invention is characterized in that it comprises a power point tracker terminal 13, also named PPT terminal 13. This PPT terminal is conductively connected with the input of the power point tracker 30. The PPT terminal 13 allows for connecting for example an impedance.

The PMIC according to the invention comprises a second conducting path 19 configured for conductively connecting the input terminal 11 with the PPT terminal 13 and a first switch S1 configured for opening and closing this second conducting path 19. The PMIC also comprises means to enable and disable the operation of the voltage converter 20 which allows to stop the transfer of power from the energy harvester connected to the input terminal 11 to the energy storage device or load connected to the first output terminal 12.

The PMIC according to the invention is further characterized in that it comprises a main controller 24 configured to repetitively perform steps of: a) closing the first switch S1, b) disabling the operation of the voltage converter, c) enabling the power point tracker 30 for sampling a voltage $V_{in-PPT}$ at the input of the power point tracker 30 and memorizing the sampled voltage or a percentage of the sampled voltage as the optimum operational voltage $V_{OPT}$. Following these steps, the main controller is further executing steps of: d) opening the first switch S1, e) enabling the operation of the voltage converter 20 and f) regulating the input voltage $V_{in}$ of the voltage converter by using as the target voltage the operational voltage $V_{OPT}$ memorized by the power point tracker 30. These steps are not necessarily performed in the order a) to f). For example, step b) can be performed before step a) or step d) can be performed after step e).

By performing the steps a) to f) repetitively, the optimum operational voltage $V_{OPT}$ is repetitively updated to guarantee optimum energy extraction from the energy harvester at all times. Typically, the steps a) to e) are performed in an evaluation time period between 1 and 1000 milliseconds and step f) is performed during an energy extraction time period between 0.1 and 100 seconds.

The voltage converter 20 comprises for example a boost converter circuit for increasing the input voltage $V_{in}$, a buck converter circuit for decreasing the input voltage $V_{in}$ or a buck-boost converter circuit for both decreasing and increasing the input voltage. These converter circuits are known in the art. For example, a boost converter circuit is schematically illustrated on FIG. 11. Such a boost converter circuit uses an inductor 23 and comprises a first $S_{VC\_1}$ and second $S_{VC\_2}$ voltage converter switch that are controlled by a voltage converter controller. This voltage converter controller can be part of the main controller 24. As shown on FIG. 11, when a boost converter is used, the inductor 23 is placed in series with the conducting path 18. As known in the art, by cyclically controlling the first $S_{VC\_1}$ and second $S_{VC\_2}$ switch, magnetic energy stored in the inductor is cyclically transferred to the load connected to the voltage converter output that is at a higher voltage $V_{out\_VC}$ than the voltage at the converter input $V_{in}$. In some embodiments, as illustrated on FIG. 9, the inductor 23 is located outside the PMIC and first 14 and second 9 inductor terminals are provided to couple the inductor to the PMIC.

Figure 11:
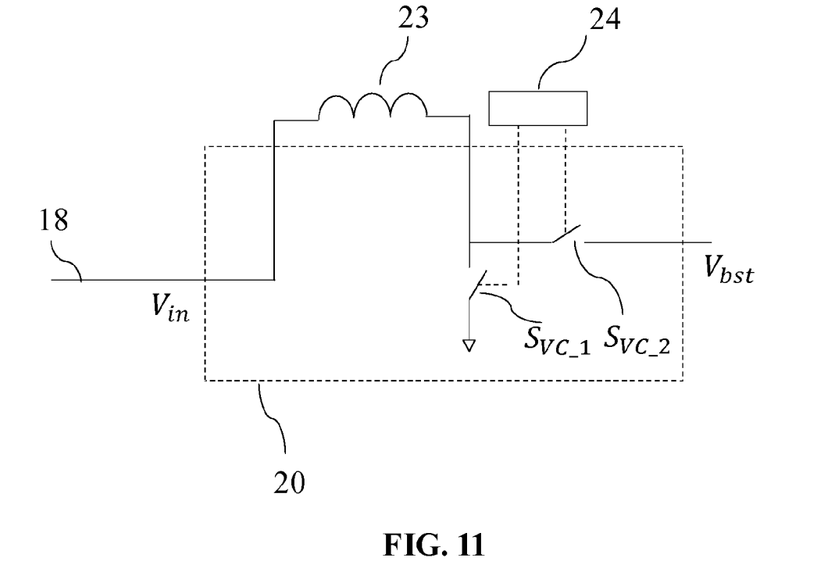

In a first example, the means to enable or disable the voltage converter make use of voltage converter switches $S_{VC\_1}$ and $S_{VC\_2}$. Indeed, by leaving the first $S_{VC\_1}$ and second $S_{VC\_2}$ switches open, the voltage converter is disabled. This prevents power from being extracted by the voltage converter.

Figure 1:
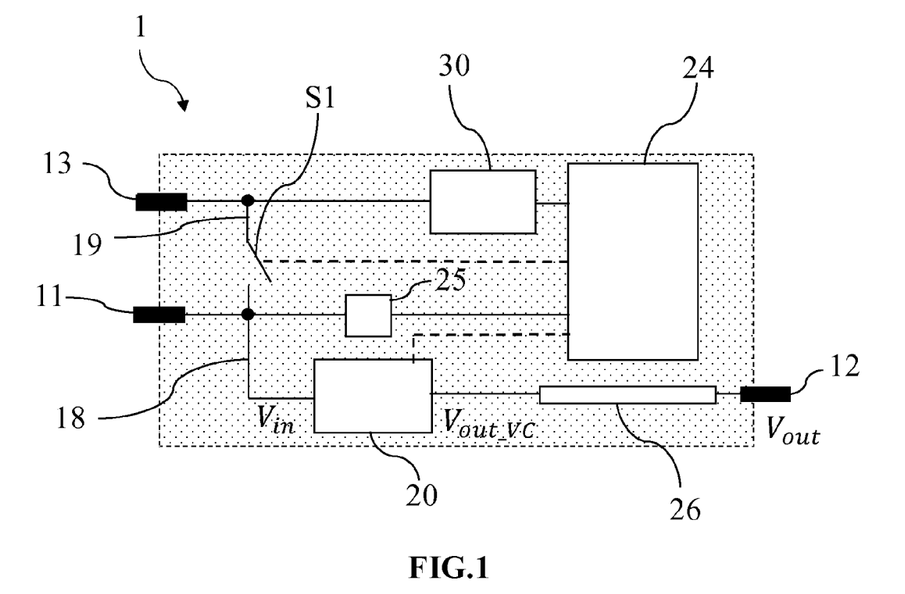
FIG. 1 schematically illustrates a PMIC according to the invention.
Figure 2:
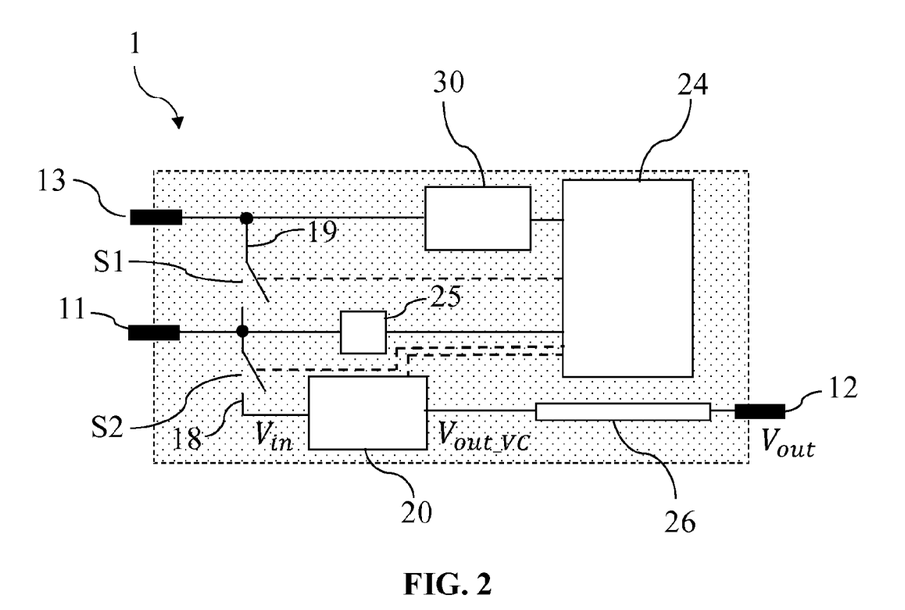
FIG. 2 shows an alternative embodiment of a PMIC according to the invention.

In some PMIC embodiments, as illustrated on FIG. 2, the means to enable and disable the operation of the voltage converter comprises a second switch S2 configured to enable/disable a current flow from the input terminal 11 to the input of the voltage converter. With this configuration when the first switch S1 is closed for performing the maximum power point evaluation, the second switch S2 is opened.

The first switch S1 and the second switch S2 have to be construed as electronic switches configured for opening or closing an electrical conducting path or conductor. These switches are for example analogue electronic switches known in the art. These switches make use of for example MOS transistors.

When extracting power from the energy harvester, the voltage converter is continuously regulating the input voltage $V_{in}$ by using as target value the last value memorized as optimum operational voltage $V_{OPT}$. The input voltage of the voltage converter is sensed by the voltage sensor 25 that is comprising a comparator or amplifier for comparing the input voltage with the target value. When the voltage at the converter input falls below the target value, the voltage converter is disabled, preventing the voltage at the converter input to lower further. On the other hand, when the voltage at the voltage converter input rises above the target value, power transfer from the converter input to its output is enabled. In this way, the input voltage $V_{in}$ is regulated to stay close to the target value.

Power point trackers for use with PMIC's for energy harvesting are known in the art. The role of the power point tracker is to define the optimum operational voltage $V_{OPT}$ to be used as input voltage of the voltage converter 20. This optimum voltage is defined by the power point tracker by sensing a voltage at the input of the power point tracker and sampling this voltage. The optimum voltage value is then considered to be a fraction, e.g. 80%, 50% or 100%, of the sampled voltage. Sampling the input voltage has to be construed as capturing or measuring the input voltage.

Figure 10:
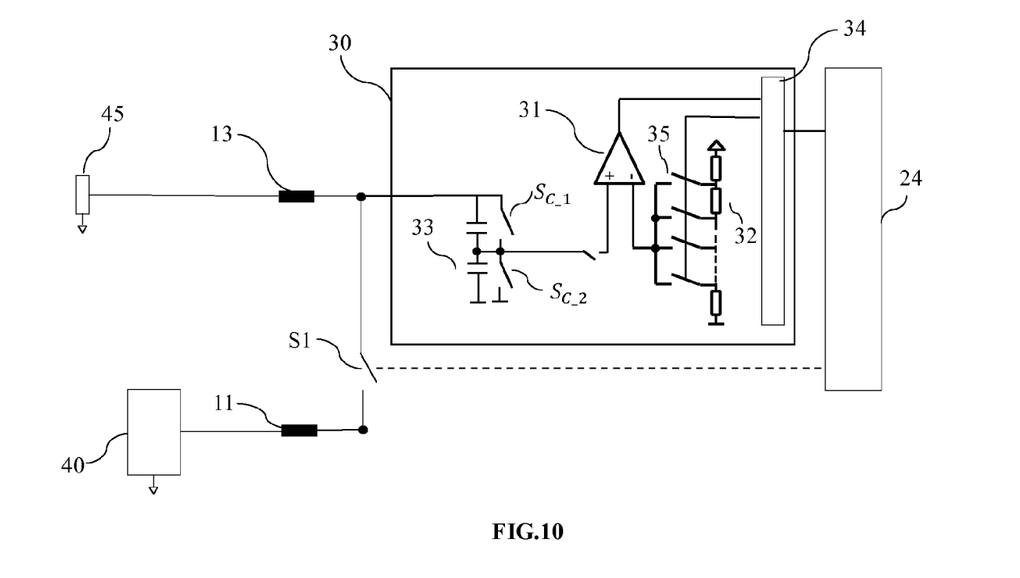

The power point tracker 30 can, for example, be implemented by an analog to digital converter (ADC) based on a successive approximation register (SAR) architecture, as schematically illustrated on FIG. 10. The power point tracker 30 comprises a resistive ladder 32, switches 35 to select an output of this resistive ladder, a capacitive ladder 33, switches $S_{C\_1}$ and $S_{C\_2}$ to reset this capacitive ladder, and a voltage comparator 31. The power point tracker also uses a PPT controller 34 which can be a dedicated controller part of the power point tracker module or it can be a controller that is part of the main controller 24.

When the power point tracker 30 is not active, the switch S1 shown on FIG. 10 remains open so as to disconnect the energy harvester 40 from the power point tracker 30. By closing the switches $S_{C\_1}$ and $S_{C\_2}$ shown on FIG. 10, the capacitive ladder 33 can be discharged.

When the power point tracker is to be operated, a number of successive steps are taking place. In a first step, the voltage converter 20 is disabled. In this way, the voltage at the harvester stabilizes either at the open circuit voltage if nothing is connected to the PPT terminal 13, or the voltage at the energy harvester stabilizes at another voltage if an impedance 45 is connected to the PPT terminal 13. In a further alternative, the switch S1 is left open and stabilization occurs at a known voltage if a high impedance voltage reference is connected to the PPT terminal 13.

In a second step, a preset fraction of the voltage at the power point tracker input is used at the positive input of the voltage comparator 31. The fraction may be at 100% or at a lower fraction value. For example for open circuit evaluation, the fraction can be set to for example 80%. In another example, when using an impedance connected to the PPT terminal 13, the fraction to be used is 100%. The fraction is determined through the use of the capacitive divider 33. If the fraction is 100% the capacitive divider 33 is an optional component. As will be further discussed below, some embodiments comprise configuration means that allow to configure the PMIC to operate at a user selected fraction.

In a third step, a fraction of a known voltage is used at the negative input of the comparator 31. Different fractions of this known voltage may be selected through the various switches 35 located at different positions of the resistive ladder. In a fourth step, the PPT controller 34 uses successive approximation to determine the fraction of the known voltage that matches the best with the voltage at the capacitive divider output. Finally, when the best match is found, this matching voltage on the resistive divider becomes the new optimum operational voltage $V_{OPT}$ that is used as target value for regulating the input voltage of the voltage converter 20. In this way, through the matching settings of the resistive divider, the optimum operational voltage is memorized. Alternatively, the PPT controller can digitally memorize the matching voltage as the optimum operational voltage by acquiring the successive comparator output values.

In preferred embodiments, the power point tracker is configurable for defining two or more values for the percentage of the sampled voltage, including a value of 100%.

Figure 4:
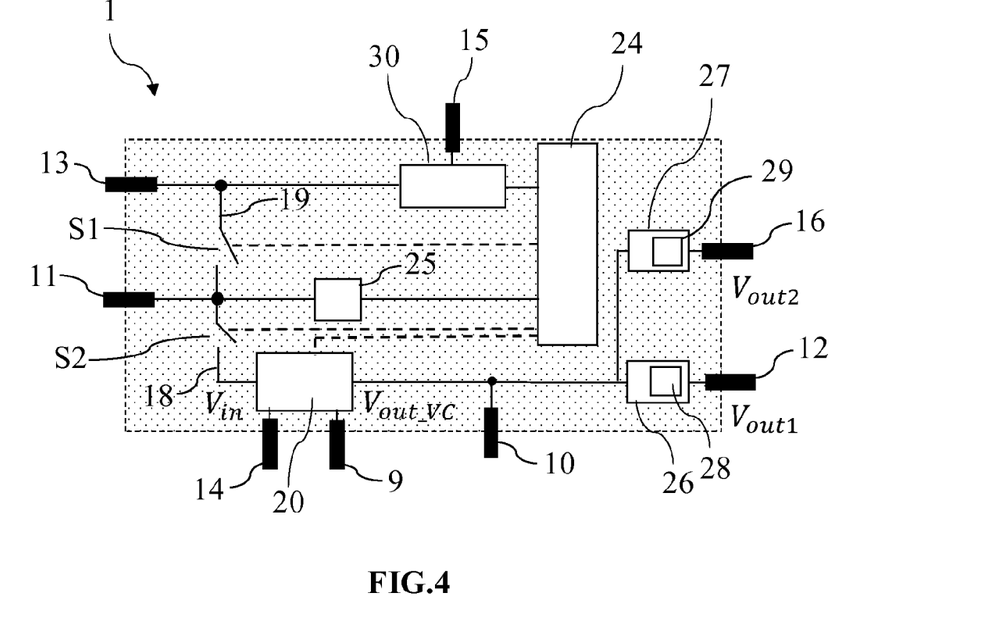
FIG. 4 shows an exemplary embodiment according to the invention having an output for a storage device and an output for a load.
Figure 5:
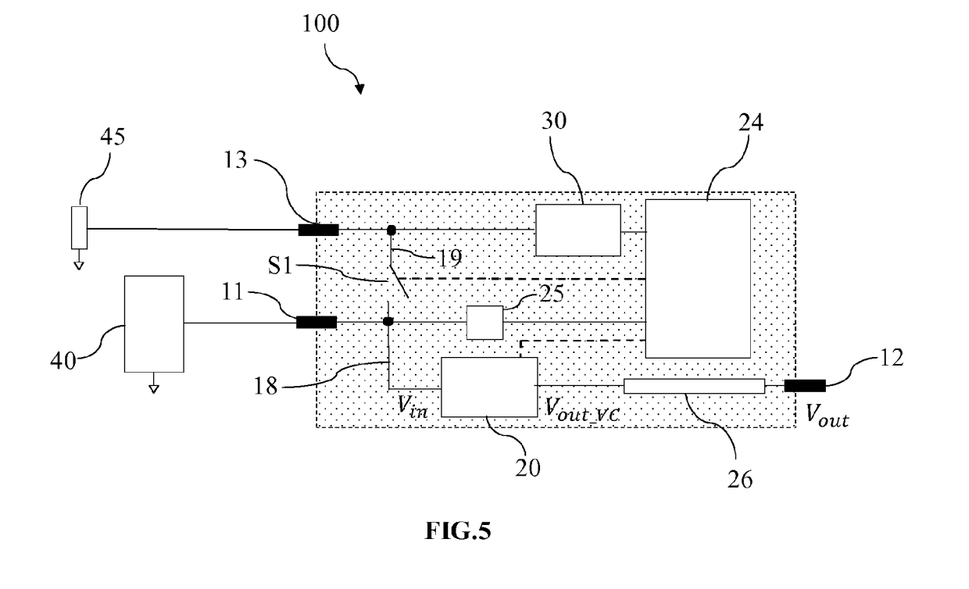
FIG. 5 shows an energy harvesting system comprising a PMIC according to the invention.
Figure 9:
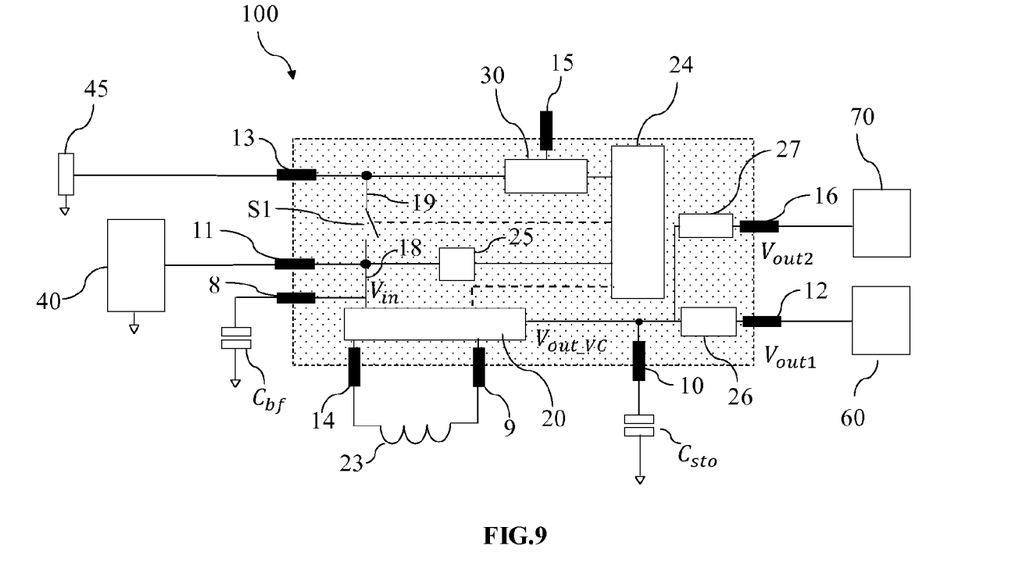
FIG. 9 shows an exemplary embodiment of an energy harvesting system, FIG. 10 schematically illustrates a power point tracker,
FIG. 11 schematically illustrates a voltage converter.

As illustrated in FIG. 4 and FIG. 9, the PMIC according to the invention can comprise a configuration terminal 15 coupled with the power point tracker 30 to provide a configuration signal to the power point tracker that allows to define what fraction or what percentage of the voltage $V_{in\_PPT}$ sensed at the input of the power point tracker needs to be taken as the optimum operational voltage $V_{PPT}$. For example, solar cells typically operate at maximum power when the voltage is at 80% of the open circuit voltage while thermoelectric harvesters typically operate optimally at 50% of the open circuit voltage. The configuration signal can for example have three defined levels indicating if the power point tracker needs to take 50%, 80% or 100% of the voltage $V_{in\_PPT}$ as the optimum operation voltage $V_{PPT}$. The configuration signal can consist of multiple signals, e.g. a bus signal to transfer configuration information. In some embodiments, the PMIC comprises more than one configuration terminal (15) to provide configuration signals or bus signals.

Figure 3:
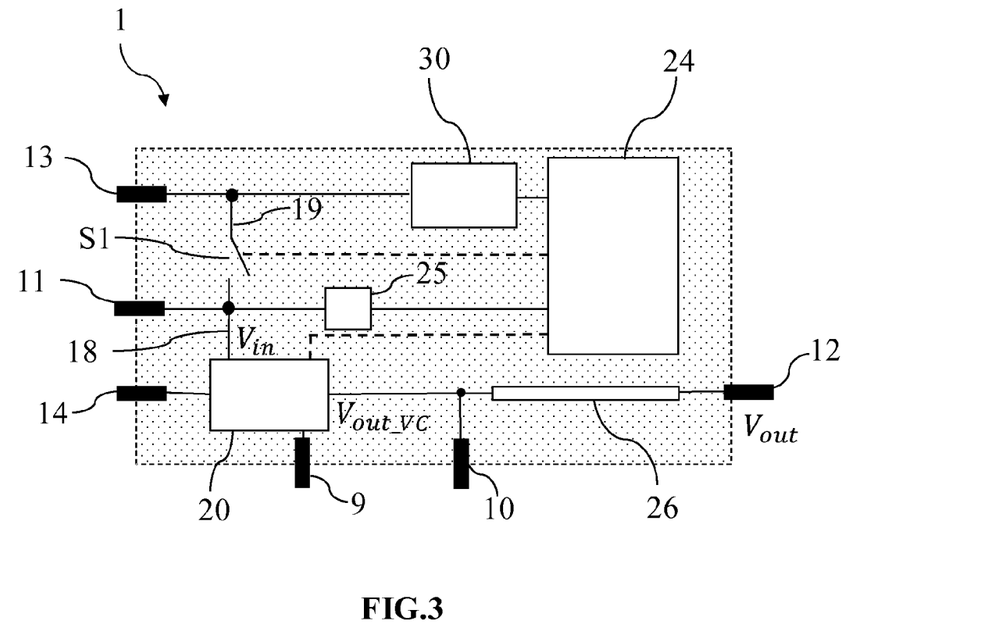
FIG. 3 shows a further embodiment of a PMIC according to the invention.

In preferred embodiments, as illustrated on FIG. 3 and FIG. 4, the PMIC comprises a storage capacitor terminal 10 for connecting a storage capacitor $C_{sto}$. The storage capacitor terminal is conductively connected with the output of the voltage converter 20. Hence, when a storage capacitor $C_{sto}$ is connected to the storage capacitor terminal 10, as illustrated in FIG. 9, the voltage $V_{out\_VC}$ at the output of the voltage converter corresponds to the voltage across the storage capacitor $C_{sto}$.

Figure 8:
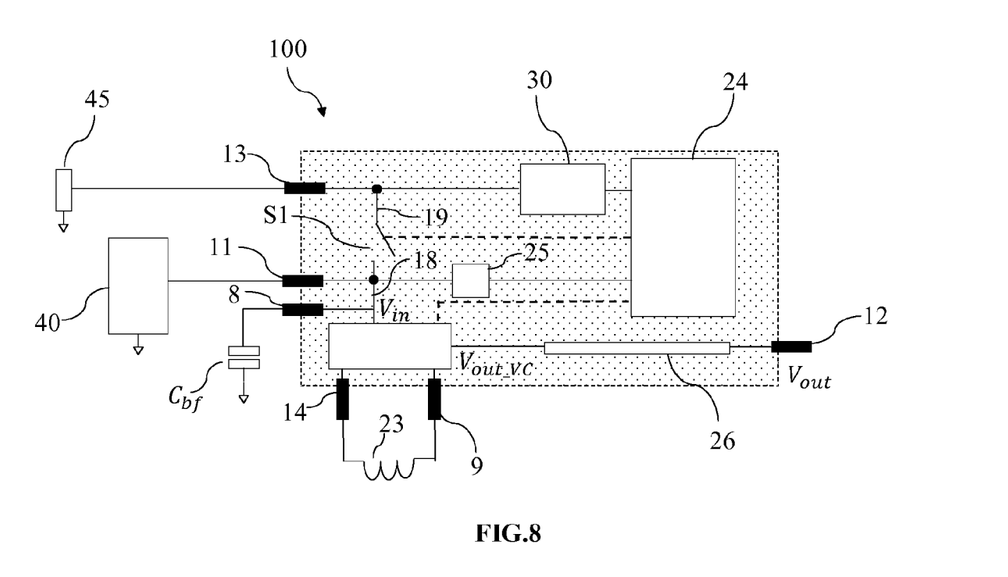
FIG. 8 shows an energy harvesting system having an external inductor.

In embodiments, a buffer capacitor $C_{bf}$ is optionally provided as illustrated on FIG. 8 and FIG. 9. The buffer capacitor is charged during the transfer of energy from the energy harvester to the storage device or load. This buffer capacitor avoids that the input node collapses when the inductor of the voltage converter is building-up current. As shown on FIG. 8 and FIG. 9, the buffer capacitor is connected to an additional capacitor terminal 8 which is connected with the input of the voltage converter. In some embodiments where the voltage converter is a DC/DC boost converter, this capacitor terminal 8 can be merged with the first inductor terminal 14.

As discussed above, the PMIC according to the invention can comprise multiple output terminals. In FIG. 4 and FIG. 9, an exemplary embodiment comprising two output terminals, a first output terminal 12 and a second output terminal 16, is shown. In the example shown on FIG. 9, the first output terminal 12, providing an output voltage $V_{out1}$, is used to be connected to an energy storage device 60 and a second output terminal 16, providing an output voltage $V_{out2}$, is used to be connected to an application load 70. In these examples, reference number 26 represents a first connecting circuit for transferring power from the voltage converter to the storage device and reference number 27 represents a second connecting circuit for transferring power from the voltage converter and/or from the energy storage device to the application load connected at the second output terminal 16. An example of an application load is a microcontroller or a radio transceiver.

In embodiments, the first connecting circuit 26 comprises a storage regulating circuit 28 configured to regulate the charging of the energy storage device and the second connecting circuit 27 comprises a load regulating circuit 29 configured to regulate the power transfer to a load application connected to the second output terminal 16. The load regulating circuit 29 typically comprises an LDO (Low Drop-Out) regulator for supplying a voltage $V_{out2}$ at the second output terminal 16.

Examples of energy storage devices 60 that can be used with the PMIC according to the invention are a rechargeable battery or a capacitor or a supercapacitor. Several types of rechargeable batteries exist on the market such as for example Li-ion batteries or NiCd batteries.

In FIGS. 5 to 9, examples of an energy harvesting system 100 comprising a power management integrated circuit PMIC according to the invention are shown wherein an energy harvester 40 is connected to the input terminal 11. An example of an energy harvester 40 is a photovoltaic cell (PV) a thermoelectric generator (TEG) or an electromagnetic energy source.

Depending on the type of energy harvester and the type of optimum power point evaluation technique to be used, the PPT terminal 13 will be coupled with a different device or input. For example, as shown on FIG. 5 and FIG. 8, an impedance 45 is connected to the PPT terminal 13. In this way, when the optimum power point evaluation is performed with the first switch S1 closed, the optimum power point evaluation is performed while the energy harvester is loaded with the impedance 45. In other words, this impedance 45 to be connected to the PPT terminal 13 is to be construed as a an impedance configured for acting as a dummy load for the energy harvester during a time period when the optimum operational voltage $V_{OPT}$ is determined with the power point tracker 30. It is known by the person skilled in the art how to determine a value for this impedance to be connected to the PPT terminal 13. Generally, the impedance value corresponds to the input impedance value that the voltage converter connected to the harvester should have in order to extract a target amount of power from the harvester.

Figure 7:
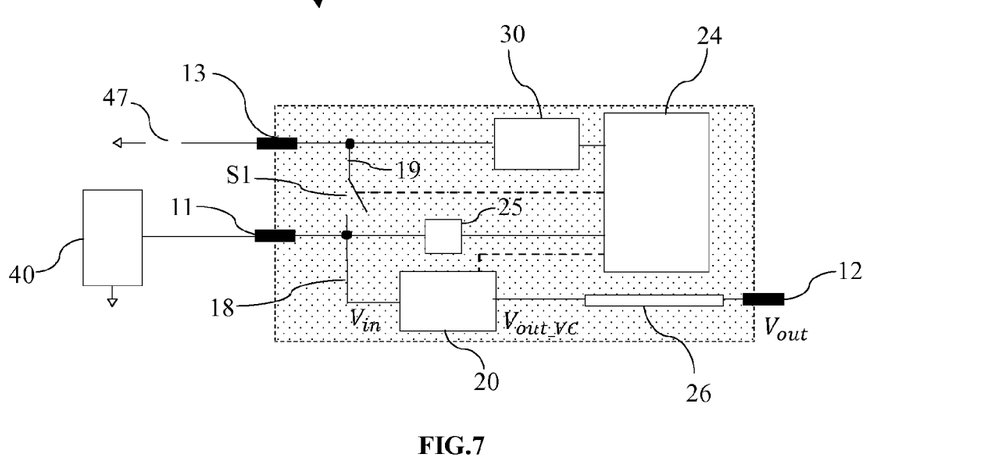
FIG. 7 shows an further example of an energy harvesting system comprising a PMIC according to the invention.

In a further example, shown on FIG. 7, the PPT terminal 13 can be an open ended terminal coupling or open circuit coupling 47 such that when the first switch S1 is closed, an open circuit voltage of the energy harvester can be sampled by the power point tracker 30. The power point tracker can then take this open circuit voltage or a fraction of the open circuit voltage as the optimum operational voltage $V_{OPT}$.

Figure 6:
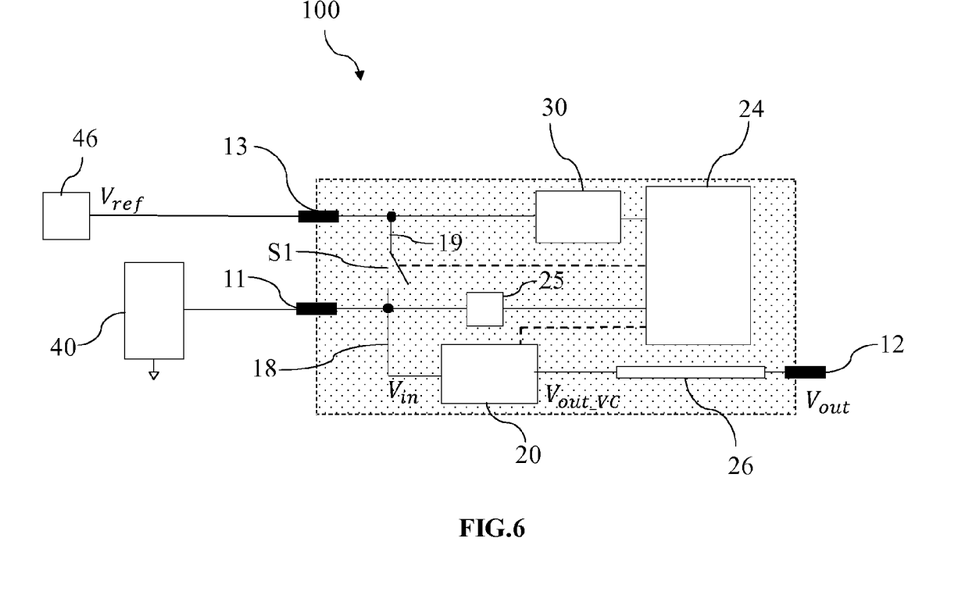
FIG. 6 shows an energy harvesting system configured for receiving a reference voltage.

Alternatively, as shown on FIG. 6, a constant reference voltage $V_{ref}$ can be applied to the PPT terminal 13 using a reference voltage generator 46. In this way, the power point tracker uses this reference value $V_{ref}$ as the optimum operating voltage value $V_{OPT}$. In this embodiment, the configuration terminal 15 can be used to transfer a signal to the power point tracker 30 to operate in a constant voltage tracking mode wherein said first switch S1 remains open during optimum power point evaluation.

In embodiments according to the invention, the PMIC comprises a voltage rectifier for converting an AC voltage present at the first input terminal 11 into a DC voltage. This allows to use an energy harvester that produces an AC power. The voltage rectifier is configured such that the voltage $V_{in}$ sensed at the input of the voltage converter 20 during energy harvesting and the voltage $V_{in\_PPT}$ sensed at the input of the power point tracker 30 during optimum power point evaluation are DC voltages. Typically the voltage rectifier is installed near the input terminal 11.

In a further example, an energy harvesting system 100 using an energy harvester producing AC power is provided. In this example, the voltage rectifier is not integrated in the PMIC but the voltage rectifier is connected between the energy harvester 40 and the first input terminal 11.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

The invention claimed is:

1. An energy harvesting system comprising:
   an energy source;
   a power management integrated circuit for managing energy from the energy source, said power management integrated circuit comprising:
   an input terminal, and wherein the energy source is connected to the input terminal such that the power management integrated circuit receives an input power from the energy source;
   a voltage converter configured to convert an input voltage $V_{in}$ into an output voltage $V_{out\_VC}$, and wherein the voltage converter is configured to regulate the input voltage $V_{in}$ at a target voltage, and wherein said target voltage is an optimum operational voltage $V_{OPT}$ for extracting power from the energy source;
   a first conducting path that transfers the input power from the input terminal to the voltage converter;
   a first output terminal that connects an energy storage device or that connects an application load;
   a first connecting circuit that transfers an output power from said voltage converter to said first output terminal;
   a power point tracker configured to determine said optimum operational voltage $V_{OPT}$ for extraction of power from the energy source with said voltage converter harvester, and wherein said power point tracker is operable for sampling a voltage $V_{in\_PPT}$ sensed at an input of the power point tracker;
   means to enable or disable the operation of the voltage converter;
   said energy harvesting system further comprising:
   an impedance configured to act as a dummy load for the energy source during a time period wherein the voltage converter is disabled and the power point tracker is determining the optimum operational voltage $V_{OPT}$ for extraction of power from the energy source;

said power management integrated circuit further comprising:

a power point tracker terminal, and wherein said impedance is connected to said power point tracker terminal;

a second conducting path configured to allow a current flow from the energy source to the impedance;

a first switch configured to enable or disable a current flow in said second conducting path by closing or opening said first switch, such that when the first switch is closed current can flow through the impedance and when the first switch is open no current can flow through the impedance;

a main controller configured to repetitively determine said optimum operational voltage $V_{OPT}$ for extracting power from the energy source by performing the steps of:

disabling the operation of the voltage converter such that no power is transferred to the first output terminal that connects with an energy storage device or that connects an application load;

closing said first switch such that said impedance acting as a dummy load is conductively connected with the energy source and current flows through the impedance;

enabling the power point tracker and sampling the voltage $V_{in\_PPT}$ sensed at said input of the power point tracker while the voltage converter is disabled and the first switch is closed such that the voltage sampled by the power point tracker corresponds to the voltage at the energy source obtained under conditions wherein the impedance acting as a dummy load is coupled to the energy source and current flows through the impedance; and memorizing the sampled voltage or a percentage of the sampled voltage as said optimum operational voltage $V_{OPT}$ for extracting power from the energy source; and wherein the main controller is further configured for operating the voltage converter and transferring power to the first output terminal that connects with an energy storage device or that connects an application load by performing steps of:

opening said first switch so as to disconnect the impedance from the energy source such that no current flows through the impedance;

enabling the operation of the voltage converter; and regulating said input voltage $V_{in}$ of the voltage converter by using as said target voltage the last optimum operational voltage $V_{OPT}$ as determined and memorized.

2. The power management integrated circuit according to claim 1 wherein said power point tracker is configurable to define two or more values for a percentage of the sampled voltage, including a value of 100%.

3. The power management integrated circuit according to claim 1 further comprising one or more configuration terminals configured to receive a configuration signal or a bus signal that indicates a percentage of the sampled voltage to be memorized as the optimum operational voltage $V_{OPT}$; and wherein said one or more configuration terminals are connected with said power point tracker to transfer said configuration signal or the bus signal.

4. The power management integrated circuit according to claim 1 wherein said means to enable or disable the operation of the voltage converter comprises a second switch configured to close or open said first conducting path so as to enable or disable the current flow from the input terminal to the voltage converter; and wherein the main controller is configured to disable the operation of the voltage converter by opening said second switch.

5. The power management integrated circuit according to claim 1 wherein said means to enable or disable the operation of the voltage converter comprises one or more switches ($S_{VC\_1}$, $S_{VC\_2}$) located in the voltage converter; and wherein the one or more switches are configured to disable the operation of the voltage converter by opening said one or more switches.

6. The power management integrated circuit according to claim 1 wherein said voltage converter further comprises a boost converter circuit, or a buck converter circuit, or a buck-boost converter circuit.

7. The power management integrated circuit according to claim 1 further comprising a first inductor terminal and a second inductor terminal that couples an external inductor to said voltage converter.

8. The power management integrated circuit according to claim 1 wherein a main controller is configured for performing a step of regulating the input voltage $V_{in}$ in a time period between 0.1 and 100 seconds; and wherein said steps of closing the first switch, disabling the operation of the voltage converter, enabling the power point tracker, opening the first switch and enabling the operation of the voltage converter are performed in a time period between 1 and 1000 milliseconds.

9. The power management integrated circuit according to claim 1 further comprising:

a second output terminal; and a second connecting circuit for transferring power from at least one of the voltage converter or from the first output terminal to the second output terminal.

10. The power management integrated circuit according to claim 1 further comprising a storage capacitor terminal that connects a storage capacitor; and wherein said storage capacitor terminal is conductively connected with the output of the voltage converter.

11. An energy harvesting system comprising:

the power management integrated circuit according to claim 9;

the energy storage device connected to said first output terminal;

a second application load connected to said second output terminal.

12. An energy harvesting system comprising:

the power management integrated circuit according to claim 1;

the energy source that produces AC power;

a voltage rectifier that converts an AC voltage into a DC voltage, and wherein said voltage rectifier is connected between said energy source and said first input terminal.

13. The energy harvesting system comprising:

the power management integrated circuit according to claim 9;

the energy storage device connected to said first output terminal;

an application load connected to said second output terminal; and a second impedance connected to said power point tracker terminal and configured as a dummy load for the energy source.

* * * * *